United States Patent [19]

Kyogoku et al.

[11] Patent Number: 5,023,024
[45] Date of Patent: Jun. 11, 1991

[54] PROCESS FOR PRODUCING MICROCAPSULES

[75] Inventors: Nobuo Kyogoku, Osaka; Takeshi Saeki, Gunma; Shigeaki Fujikawa, Osaka, all of Japan

[73] Assignee: Suntory Limited, Osaka, Japan

[21] Appl. No.: 296,777

[22] Filed: Jan. 13, 1989

[51] Int. Cl.$^5$ .................... B01J 13/20; B01J 13/10
[52] U.S. Cl. ................ 264/4.3; 427/213.33; 427/213.35; 424/492; 426/98
[58] Field of Search ............ 427/212.33, 213.35; 264/4.3; 424/492; 426/98

[56] References Cited

U.S. PATENT DOCUMENTS

| | | | |
|---|---|---|---|
| 3,582,495 | 6/1971 | Emrick | 264/4.3 X |
| 3,627,695 | 12/1971 | Scarpelli | 264/4.3 |
| 3,944,502 | 3/1976 | Matsukawa et al. | 264/4.3 |
| 4,294,921 | 10/1981 | Yamaguchi et al. | 264/4.3 X |
| 4,460,686 | 7/1984 | Hartmeier | 435/137 |
| 4,661,526 | 4/1987 | Ford | 521/53 |
| 4,775,745 | 10/1988 | Ford et al. | 534/560 |

FOREIGN PATENT DOCUMENTS

| | | |
|---|---|---|
| 58-149645 | 9/1983 | Japan . |
| 63-57981 | 6/1988 | Japan . |
| 258641 | 10/1988 | Japan ................ 264/4.7 |
| 023860 | 1/1989 | Japan . |
| 023861 | 1/1989 | Japan . |

OTHER PUBLICATIONS

Kondo, Asaji, "Microcapsule Processing and Technology," 1979 (Marcel Dekker, New York), pp. 70-81, 92-93.
Fujikawa, S. et al., "Genipin, a New Type of Protein Crosslinking Reagent from Gardenia Fruits", *Agric. Biol. Chem.*, 52(3), 869-870 (1988).
Japan Industrial Newspaper, Jun. 8, 1988.
"Utilization of Natural Cross-Linking Agent for a Microcapsule", Kyogoku et al., 35th Meeting Nippon Shokuhin Kogyo Gakkai (1988).
"Thermo-Resistance Microcapsule", Kyokai, lecture summary, 1988.
Suntory Limited, Public Relations Dept., "Gelatine Microcapsule Highly Resistant to Heat", JETRO, Oct. 1988, vol. 16, No. 7.

*Primary Examiner*—Brooks H. Hunt
*Assistant Examiner*—John M. Covert
*Attorney, Agent, or Firm*—Cushman, Darby & Cushman

[57] ABSTRACT

A process for producing microcapsules which comprises forming a wall of coacervates on microdroplets of an oily substance of water-insoluble solid particles through reaction between gelatin and an anionic polymer, allowing a ylidoid compound to act on the coacervates so that cross-linking occurs between the polymer molecules of gelatin to harden the microcapsules.

4 Claims, No Drawings

PROCESS FOR PRODUCING MICROCAPSULES

BACKGROUND OF THE INVENTION

The present invention relates to the production of microcapsules containing as the core material oily substances or water-insoluble solid particles. More particularly, the present invention relates to a process for producing microcapsules which comprises forming a wall of coacervates on microdroplets of an oily substance of water-insoluble solid particles through reaction between gelatin and an anionic polymer, and allowing an iridoid compound to act on the coacervates so that cross-linking occurs between the polymer molecules of gelatin to harden the microcapsules.

Microcapsules which are tiny particles of a core material surrounded by a coating consisting of a wall material such as gelatin serve to protect the core material from its surroundings by means of the wall membrane, or to control the time, place or rate at which the core material is released. Having these capabilities, microcapsules have been extensively used in pressure-sensitive copy paper, foodstuffs, pharmaceuticals and in many other fields of industry.

One of the common methods for producing microcapsules is "complex coacervation" which is commercially the most common for pressure-sensitive copy paper. In this process, two colloidal substances, such as gelatin and an anionic polymeric substance, having mutually opposite electric charges, are added to a core-containing suspension to form an aqueous sol, which is then pH-adjusted or otherwise treated to form a wall of coacervates on the microdroplets of an oily core material, and after they have gelled the coacervates are hardened with a hardening agent to form microcapsules. Details of this complex coacervation process are disclosed in U.S. Pat. No. 2,800,457, etc. and many methods of improvement have been proposed.

For instance, Japanese Patent Publication No. 39-24782 proposes that the temperature of the system be slowly elevated in the presence of a hardening reagent in order to shorten the duration of the hardening treatment. Japanese Patent Publication Nos. 47-16166, 47-16167 and 47-16168 propose that in order to prevent agglomeration of coacervates, an anti-shock agent be added after the wall membrane of coacervates has been gelled. Japanese Patent Publication Nos. 50-27827, 50-27828 and 50-27829 show that by adding an anti-shock agent such as CMC or an acrylic acid copolymer together with an anionic surfactant, it is possible to prevent any increase in viscosity that would otherwise occur on account of the reaction taking place between gelatin and aldehyde during the pre-hardening step. Japanese Patent Public Disclosure No. 61-4527 discloses a method in which a water-soluble wax derivative is added after gelation and before hardening. Methods employing hardening agents that may be added to foods are disclosed in Japanese Patent Public Disclosure Nos. 59-36540, 60-37934, 61-4527, 61-78351, etc.

As described above, numerous improvements have been developed in the technology of microencapsulation by complex coacervation. However, there still remains much room for improvement in the art of hardening coacervates. For example, no process has yet been developed for producing microcapsules employing a hardening agent which can be safely incorporated in foodstuffs, which is stable, and which allows the hardening treatment to be effected within a short period. Hardening agents that are most commonly employed in the conventional techniques of complex coacervation are aldehydes such as formaldehyde and glutaraldehyde. However, aldehydes are toxic and cannot be used in the production of microcapsules to be incorporated in foodstuffs.

A further problem with the use of aldehydes as hardeners is that the pH of the system has to be adjusted to the alkali side in order to increase the rate of hardening reaction. Unless utmost care is exercised in the pH adjustment, agglomeration of coacervates and other troubles will occur to increase the complexity of process control.

Hardeners that have been employed in the production of microcapsules for incorporation in foodstuffs include glucono delta lactone, tannic acid, potassium alum [$KAl(SO_4)_2.12H_2O$] and ammonium alum [$NH_4Al(SO_4)_2.12H_2O$]. Glucono delta lactone and tannic acid harden gelatin by causing acid denaturation of the gelatin protein, and the alum compounds achieve the same result by binding between the molecules of gelatin protein. However, all of these hardeners are slow in their hardening rate because their action is weaker than that of aldehydes. If the reaction temperature is raised in an attempt to increase the hardening rate, the chance of coacervates being broken is increased. Under these circumstances, the hardening reaction must be carried out over a prolonged period (usually several tens of hours) at room temperature. Furthermore, the wall membrane of the resulting capsules is weak and has insufficient heat resistance.

SUMMARY OF THE INVENTION

The present invention has been accomplished in order to solve the aforementioned problems of the prior art and its principal object is to provide a method of hardening coacervates in the production of microcapsules (i) in a pH range that will not cause agglomeration of the coacervates (ii) within a short period of time (iii) without employing any harmful component that cannot be incorporated in foodstuffs and by which (iv) microcapsules having high physical strength and heat resistance can be obtained.

This object of the present invention can be attained by a process for producing microcapsules by complex coacervation of an aqueous solution of gelatin and an anionic polymeric substance having a core material present in an emulsified or dispersed state, which is characterized in that the gelatin in the wall membrane of coacervates formed around the microdroplets of the core material is hardened by a crosslinking reaction with an iridoid compound so as to produce microcapsules.

DETAILED DESCRIPTION OF THE INVENTION

The present inventors found that iridoid compounds, in particular genipin, are a very effective hardeners for use in the production of microcapsules having a gelatin wall membrane.

The present invention provides a process for producing microcapsules by complex coacervation of an aqueous solution of gelatin and an anionic polymeric substance having a core material present in an emulsified or dispersed state, which is characterized in that the gelatin in the wall membrane of coacervates formed around the microdroplets of the core material is hardened by a crosslinking reaction with an iridoid compound so as to produce microcapsules.

The first step of the process of the present invention is to have the core material emulsified or dispersed in an aqueous solution containing gelatin and an anionic polymer. This may be accomplished by mixing an aqueous solution of an anionic polymer with an aqueous gelatin solution that has the core material emulsified or dispersed in it. Alternatively, the core material emulsified or dispersed in the aqueous solution of an anionic polymer may be mixed with the aqueous gelatin solution. Still another approach is to have the core material emulsified or dispersed in an aqueous solution containing gelatin and an anionic polymer. In short, the first step of the process of the present invention is satisfactorily performed if the core material is emulsified or dispersed in an aqueous solution containing gelatin and an anionic polymer.

A suitable core material may be selected from among oily substances such as flavor oils and lecithin, and from water-insoluble solid particles such as stearyl alcohol.

There is no particular limitation on the gelatin that can be used but it is preferable to use gelatin having good physicochemical and chemical properties as typified by good film-forming ability, the nature of an ampholyte, the controllability of the quantity of charges by pH, and the occurrence of the change from sol to gel at a critical temperature. Stated specifically, any gelatin that satisfies the specifications for use in the production of a certain microcapsule may be employed. More preferably, gelatin having an isoelectric point of pH 8–9 and a bloom strength of 280–320 is used.

Any anionic polymer that reacts with gelatin to form complex coacervates may be employed and preferred examples include gum arabic, sodium alginate, agar, carrageenan, carboxymethyl cellulose, sodium polyacrylate, polyphosphoric acid, etc.

The mixture of gelatin and a suitable anionic polymer is diluted with warm water; thereafter, an acidic aqueous solution such as acetic acid is added to reduce the pH of the system to the isoelectric point of gelatin or below, and the mixture is stirred with the temperature elevated at least to the gelling point of gelatin. In this step, coacervates will form. The pH of the reaction system is normally reduced to between 4.0 and 5.0 but this condition need not be satisfied if the pH is no higher than the isoelectric point of the gelatin used. The temperature of the system is usually adjusted to be within the range of 45°–55° C.

The coacervates are then cooled to 20° C. or below to gel and are thereafter subjected to a hardening reaction. What is important to the process of the present invention is that an iridoid compound is used as a hardening agent. Stated more specifically, an iridoid compound is added to a coacervate-containing slurry and the temperature of the system is slowly elevated to effect the hardening reaction. In this step, the gelatin component of the coacervates is hardened to become water-insoluble, thereby completing the production of microcapsules having the core material confined in the shell of coacervates.

Any iridoid compound having a crosslinking ability may be used in the process of the present invention and illustrative examples are the aglycones of geniposide, gardenoside, geniposidic acid, etc. Of these compounds, genipin derived from Gardenia jasminoides Ellis which is the aglycone of geniposide is most preferred. These iridoid compounds may be prepared in accordance with the disclosures in Japanese Patent Publication No. 57-14781, Japanese Patent Public Disclosure No. 61-47167, etc.

The amount of the iridoid compound to be used in the hardening reaction ranges from 0.001 to 1.0 part per part of gelatin on a dry weight basis. In accordance with the process of the present invention, the amount of iridoid compound used may be adjusted to control the physical properties and heat stability of the microcapsules to be obtained, thereby making it possible to produce microcapsules of a desired strength.

The hardening reaction is preferably conducted at a pH of 4–10, more preferably below 7 where agglomeration of coacervates will not easily take place. One of the great advantages of the present invention is that the coacervates can be hardened within this preferred range of pH. The reaction temperature may be within the range of 5°–60° C. Since the iridoid compounds have a comparatively strong cross-linking action, the intended hardening reaction can be accomplished without further elevating the temperature. The reaction time varies with pH and temperature, but a satisfactory hardening treatment can be performed by leaving the system to stand or stirring it for a period of 0.5–24 hours.

It has been reported that the iridoid compounds derived from Gardenia jasminoides Ellis which are used as hardeners in the process of the present invention react with primary amino compounds and are further polymerized under oxidizing conditions to form blue dyes (Japanese Patent Publication No. 57-14781 and Japanese Patent Public Disclosure No. 61-47167). The safety of the blue dyes thus formed has been widely recognized as a result of their extensive use as natural pigments in foods. Therefore, the microcapsules produced in the process of the present invention by crosslinking an iridoid compound with complex coacervates of gelatin and an anionic polymer are also safe and are of particular utility for use in foods, pharmaceuticals and other fields of industry.

The following examples are provided for the purpose of further illustrating the present invention but are in no way to be taken as limiting.

EXAMPLE 1

Peppermint oil (9 g) was dispersed and emulsified, with stirring, in 30 g of a 10% aqueous solution of gelatin (Type A) at 40° C. to form an oil-in-water (O/W) emulsion. To the resulting emulsion, 30 g of a 10% aqueous gum arabic solution preheated to 40° C. was added with stirring. To the liquid mixture, 140 g of warm water (40° C.) was added, followed by addition of acetic acid to adjust the pH of the system to 4.0. The system was quickly quenched to 10° C. with stirring. Thereafter, 3 g of genipin was added to the system while at the same time, its pH was adjusted to 6.0 with sodium hydroxide. Subsequently, a hardening treatment was conducted by raising the temperature of the system to 40° C. at a rate of 1° C./min. The precipitated microcapsules were thoroughly washed with water to remove any uncrosslinked genipin and thereafter centrifuged for 10 minutes at 2,800 rpm to recover the microcapsules as the final product.

EXAMPLE 2

A cold (10° C.) microcapsule solution was prepared as in Example 1. To the system was added 3 g of genipin and the resulting system having a pH of 4.0 was subjected to a hardening treatment for 18 hours at 20° C.

under mild stirring. The precipitated microcapsules were washed thoroughly with water to remove any uncrosslinked genipin and thereafter centrifuged for 10 minutes at 2,800 rpm to recover the microcapsules as the final product.

EXAMPLE 3

Microcapsules were produced by the same procedures of microencapsulation as those adapted in Example 2 except that the amount of genipin was reduced to 0.3 g.

EXAMPLE 4

Microcapsules were produced by the same procedures of microencapsulation as those adapted in Example 2 except that the amount of genipin was further reduced to 0.03 g.

The microcapsules produced in Examples 1-4 were suitable for use as peppermint flavors in ready-to-eat foods.

COMPARATIVE EXAMPLE 1

A cold (10° C.) microcapsule solution was prepared as in Example 1. Three grams of glucono delta lactone was added to the solution under stirring and a hardening treatment was then performed by mildly stirring the mixture at 20° C. for 18 hours. The precipitated microcapsules were washed thoroughly with water and centrifuged at 2,800 rpm for 10 minutes to recover the microcapsules as the final product.

COMPARATIVE EXAMPLE 2

Microcapsules were produced as in Comparative Example 1 except that 3 g of potassium alum was used as a hardener.

COMPARATIVE EXAMPLE 3

Microcapsules were produced as in Comparative Example 1 except that 3 g of tannic acid was used as a hardener.

COMPARATIVE TEST

The microcapsules produced in Examples 1-4 and Comparative Examples 1-3 were dried, and 5 g of each sample was added to 100 ml of distilled water. The solutions were heated at a rate of 1° C./min and the temperature at which the wall of microcapsules in each sample thoroughly dissolved was measured. The results are shown in Table 1; the walls of the microcapsules in the samples of Examples 1 and 2 dissolved at 100° C. and those of the microcapsules in the sample of Example 3 dissolved at 80° C.; in contrast, wall dissolution occurred at 45° C. and below in the samples of Example 4 and Comparative Examples 1-3.

These results show that by hardening coacervates with genipin, the heat resistance of microcapsules was improved, the duration of hardening treatment was shortened (see Example 1), and the degree of heat resistance could be controlled by adjusting the amount of genipin added.

Table 1 also shows the amount of agglomeration which occurred in the microcapsules of Examples 1-4 and Comparative Examples 1-3 after centrifugation. No detectable agglomeration occurred in the samples produced in Examples 1-4, but the wall membranes of the capsules prepared in Comparative Examples 1-3 were so weak that they readily formed agglomeration materials. It is therefore clear that the hardening treatment with genipin is also effective in improving the handling properties of microcapsules.

TABLE 1

| Sample No. | Capsule melting temperature °C. | Agglomeration of microcapsules |
|---|---|---|
| Example | | |
| 1 | 100 | — |
| 2 | 100 | — |
| 3 | 80 | — |
| 4 | 45 | — |
| Comparative Example | | |
| 1 | 35 | ++ |
| 2 | 40 | ++ |
| 3 | 45 | + |

—: No agglomeration
+: Some agglomeration
++: Extensive agglomeration

The present invention provides a process for producing microcapsules by complex coacervation using gelatin as at least one hydrophlic colloid. In this process, an iridoid compound having no human toxicity which can be safely incorporated in foodstuffs is used as a hardener for coacervates. Besides the advantage of rapidity of treatment, the iridoid compound is capable of hardening coacervates with reduced agglomeration, thereby enabling the desired microcapsules to be produced easily and efficiently. If desired, an appropriate degree of heat resistance can be imparted to the microcapsules, so they have potential use in a wide range of applications including the food and pharmaceutical industries.

What is claimed is:

1. In a process for producing microcapsules by complex coacervation of an aqueous solution of gelatin and an anionic polymeric substance having a core material present in an emulsified or dispersed state, the improvement wherein the gelatin in the wall membrane of coacervates formed around the microdroplets of the core material is hardened by a crosslinking reaction with an iridoid compound to produce heat stable and edible microcapsules.

2. A process according to claim 1 wherein the iridoid compound is used in an amount of 0.001-1.0 part per part of gelatin on a dry weight basis.

3. A process according to claim 1 wherein the hardening reaction is performed at a pH of 4-10 and at a temperature of 5°-60° C.

4. A process according to any one of the preceding claims wherein said iridoid compound is genipin.

* * * * *